United States Patent [19]

Francis et al.

[11] Patent Number: 4,580,936

[45] Date of Patent: Apr. 8, 1986

[54] BLIND RIVET ASSEMBLY

[75] Inventors: Albert C. Francis, Stevenage; Raymond D. Lacey, Essendon; Michael Woodrow, Hatfield, all of England

[73] Assignee: Advel Limited, Hertfordshire, England

[21] Appl. No.: 584,634

[22] Filed: Feb. 29, 1984

[30] Foreign Application Priority Data

Mar. 7, 1983 [GB] United Kingdom ................ 8306188

[51] Int. Cl.⁴ ............................................. F16B 13/04
[52] U.S. Cl. ...................................... 411/38; 411/43; 411/70
[58] Field of Search ................................... 411/34–38, 411/41–43, 45, 57, 59, 69, 70

[56] References Cited

U.S. PATENT DOCUMENTS

| | | | |
|---|---|---|---|
| 2,536,353 | 1/1951 | Cooper | 411/70 |
| 3,055,255 | 9/1962 | Burrell | 411/34 |
| 3,230,818 | 1/1966 | Siebol | 411/34 |
| 4,046,053 | 9/1977 | Alvi et al. | 411/43 |
| 4,355,934 | 10/1982 | Denham et al. | 411/38 |

Primary Examiner—Kenneth J. Dorner
Assistant Examiner—Neill Wilson
Attorney, Agent, or Firm—Oblon, Fisher, Spivak, McClelland & Maier

[57] ABSTRACT

A blind, self-plugging rivet assembly for securing together two members (42, 43) is of the type comprising a tubular shell (13) with an enlarged head (14) at one end, and a stem (12) which extends through the bore (15) of the shell, the stem having an enlarged head (38) beyond the tail end (18) of the shell.

The shell has a weakened zone (19) formed by three slits (22) extending along part of the shell shank and spaced apart equiangularly around it. The stem head (38) lies beyond the shell tail end, and has an underhead surface (39) which is slightly convex and is bounded by a sharp edge (40).

The stem has a pulling portion (32) connected by a breakneck to a plugging portion (31) which is an interference fit in the shell bore. Adjacent the breakneck the plugging portion has a cylindrical skirt which, when the rivet has been installed, can be deformed outwardly to lock the plugging portion to the shell. A bead on the stem guides the tool for deforming the skirt.

12 Claims, 8 Drawing Figures

BLIND RIVET ASSEMBLY

This invention relates to a blind rivet assembly. More particularly it relates to a blind rivet assembly of the so-called "self-plugging" type, which comprises a tubular shell and a stem, and in which part of the stem remains in the shell of the installed rivet to plug the tubular shell. A blind rivet is one which can be set without access to the remote or blind side of the workpieces.

Rivets of this general kind are well known and have been made in a variety of different forms in order to meet various specific requirements.

The present invention provides blind rivet assembly comprising a tubular shell and a stem;

the shell having an elongate shank, a head at one end, and a bore throughout the head and shank;

the shell bore having a radially enlarged counterbore at its head end and an annular locking shoulder facing towards the head end at the junction of the counterbore and the remainder of the bore;

the shell shank being weakened over a zone which extends longitudinally of the shank from a position spaced from the tail end (i.e. the end thereof remote from the head) of the shank towards the head end;

the stem extending through the bore of the shell and having an elongate pulling portion which projects from the head end of the shell, and an elongate plugging portion connected to the pulling portion by a breakneck and disposed substantially with the shell shank bore;

the plugging portion being formed with a radially enlarged stem head at the end thereof remote from the breakneck, and disposed beyond the tail end of the shank;

whereby, when the assemby is inserted through aligned apertures in workpieces to be thereby riveted together so that at least part of the shell shank weekened zone projects beyond the workpieces on the blind side thereof, and the pulling portion of the stem is pulled with increasing tension with respect to the shell;

firstly compression exerted by the stem head on the shell shank tail end causes radial enlargement of at least part of the weakened zone of the shell shank to form a blind head, whilst the plugging portion moves through the shell bore towards the head end thereof;

and thereafter the shell shank tail end deforms to allow the entry of the stem head thereinto;

thereafter the part of the plugging portion adjacent to breakneck being deformable into locking engagement with the annular locking shoulder of the shell counterbore, and the stem being fracturable at the breakneck to leave the plugging portion plugging the shell bore.

Other preferred features of the invention will become apparent from the appended claims. An embodiment of the invention will now be described, by way of example, and with reference to the accompanying drawings in which:

Figure 3:
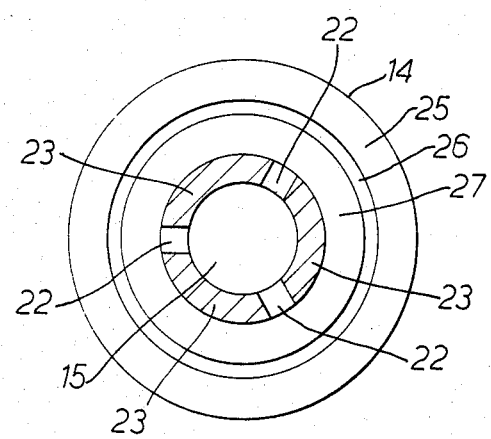
FIG. 3 is a section on the line 3—3 of FIG. 1.
Figure 1:
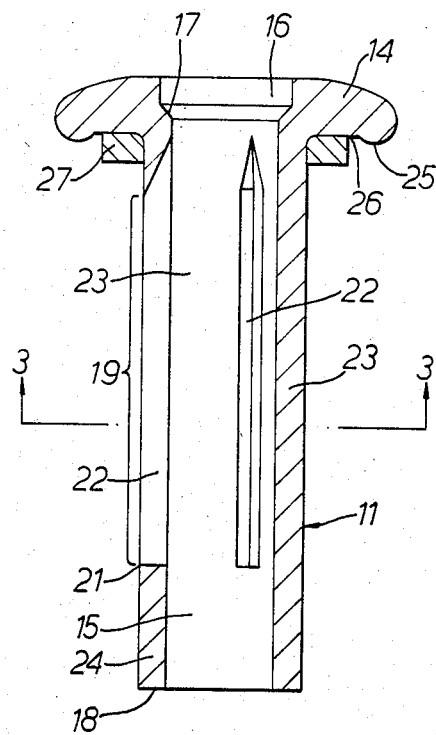
FIGS. 1 and 2 are, respectively a sectional elevation of the shell, and a side elevation of the stem, for a blind rivet, prior to assembly together.
Figure 2:
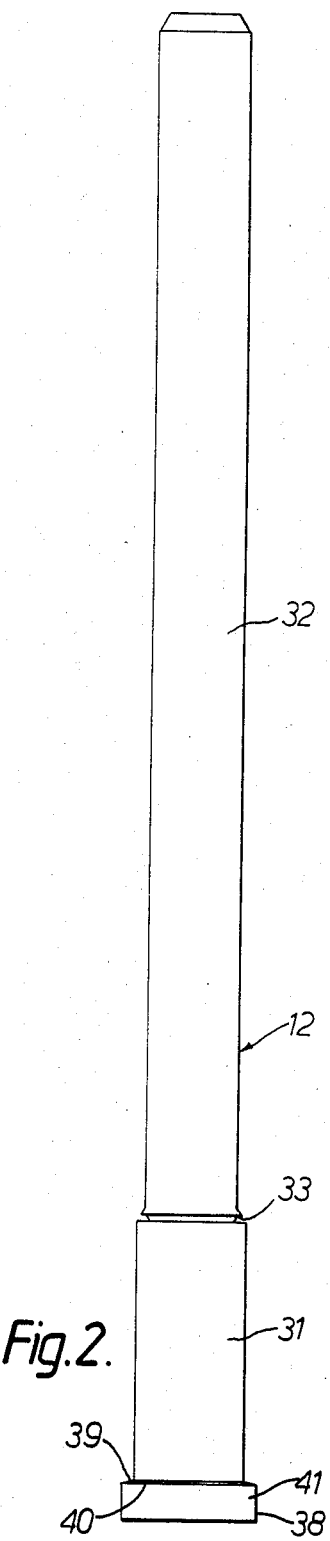

The self-plugging blind rivet assembly 10 (FIG. 4) consists of two parts, namely, a tubular rivet shell 11 and a stem 12, which are assembled together.

The rivet shell is made of aluminium alloy and has an elongate shank 13 and a radially enlarged head 14 formed integrally with the shank at one end (the head end) of the shell. The shell has a bore 15 throughout its length, the diameter of the bore being increased at the head end by a head counterbore 16. Except for this, the bore 15 is of uniform diameter (subject to manufacturing tolerances) throughout its length.

The head counterbore 16 is shorter than the thickness of the head and provides a locking shoulder 17 at the junction between the bore 15 and counterbore 16. The locking shoulder face towards the head end of the shell. The tail end of the shell has a flat face 18 perpendicular to the longitudinal axis of the shell.

The shell shank is weakened over a zone 19 which extends from a position 21 spaced away from the tail end face 18 and extending along the shell shank nearly to the head 14. The weakened zone comprises three longitudinal slits 22 spaced equiangularly around the shank. The slits are made as narrow as practicable in the circumferential sense, and define between adjacent ones of them three longitudinal struts 23 which are separated from each other by the slits and which, when the shank is subjected to axial compression, will bend outwardly, as will become apparent.

The tail-end portion 24 of the shell, between the end 21 of the weakened zone and the tail end face 18 of the shank, is of course stronger then the weakened zone.

The underside of the head 14 which faces towards the tail end of the body is undercut to leave a circumferential sealing lip 25 surrounding a flat face 26 which receives a resilient sealing washer 27 (FIG. 4) which assists the formation of a seal between the shell head and a workpiece in which the rivet is installed.

The stem 12 is also made of aluminium alloy. The stem comprises a plugging portion 31 which, after setting of the rivet, serves to plug the bore of the body, and an elongated pulling portion 32 which is joined to the plugging portion 31 by a breakneck. The pulling portion is of less external diameter than the plugging portion, and will pass through the shell bore 15 without interference.

The breakneck is the weakest part along the length of the stem so that, when the stem is subjected to progressively increasing tension, it will break at the breakneck rather than elsewhere. The plugging portion 31 is of uniform external diameter throughout its length (subject to manufacturing tolerances) and is an interference fit in the bore 15 of the tubular shell 11, and is appreciably shorter in length than the shell shank 13.

To enable the plugging portion 31 to be locked to the shell 11 during setting of the rivet, the part of the plugging portion adjacent the breakneck is formed with a cylindrical cleavage 34 (see FIG. 4) which extends into the plugging portion plug in the longitudinal direction away from the breakneck. The cleavage has a diameter the same as, or minutely greater than, that of the pulling portion 32, and differentiates the part of the plugging portion adjacent to the breakneck into a central cylindrical core 35 of substantially the same diameter as the pulling portion 32, and a skirt 36 which peripherally surrounds the core 35, the skirt being integrally joined with the remainder of the plugging portion in the region further from the breakneck than the cleavage extends. The skirt presents an annular face or step 37 which faces towards the pulling portion 32. The skirt is deformable, by means of a suitable riveting tool, to form an outwardly directed flange capable of abutting the locking shoulder 17 in the body, and thus provides locking means for locking the plugging portion in the shell of the rivet. An enlarged annular bead 33 at the breakneck has tapered sides and a diameter larger than that of the cleavage 34 but smaller than that of the skirt.

The plugging portion 31 is formed with a radially enlarged head 38 at the end remote from the breakneck. This head has an underhead surface 39 having an extreme diameter slightly less than that of the shell shank end face 18. In this example the underhead face 39 is not absolutely flat but is in the form of a very shallow convex cone, having an included angle of about 170 degress (an absolutely flat face would have an included angle of 180 degrees). The outer edge 40 of the underhead surface 39 is a sharp edge, and the peripheral face 41 of the head 38 is cylindrical i.e. of uniform diameter throughout its length.

The shell and stem are assembled by inserting the pulling portion 32 of the stem into the tail end of the shell and passing it along the bore until the plugging portion 31 meets the tail end of the shell. Sufficient force is then exerted to drive the pulling portion into the bore, in which it is an interference fit. It may be desirable to support the exterior of the shell in a die or other form of peripheral clamp, to prevent radical expansion of the shell as the plugging portion is driven in. The stem is thus forced into the shell until the underface 39 of the stem head 38 contacts the end face 18 of the shell. The stem and shell are thus assembled, i.e. in the condition illustrated in FIG. 4. The breakneck lies about one third of the way along the weakened zone 19. The pulling portion 32 of the stem projects from the head end of the shell.

The interference between the plugging portion 31 and the interior of the shell shank 13 maintains the parts of the rivet in an assembled condition ready for use.

The use of the assembled rivet 10 to fasten together apertured workpiece members will now be described.

An apertured panel member 42 (which may be of a soft or easily fractured material such as glass fibre reinforced plastics material) may be fastened to another apertured member 43 (which may, for example, be a metallic support member for the panel), by bringing the members together with their apertures 44 in register and inserting the shell shank through the apertures until the sealing washer 27 under the head 14 abuts the face 45 of the member nearer the operator, and the tail-end portion 24 and at least a portion of the weakened zone of the shell shank projects beyond the back or blind face 46 of the workpieces. The diameter of the apertures 44 in the panels is of course made very slightly larger than the external diameter of the shell shank.

Figure 4:
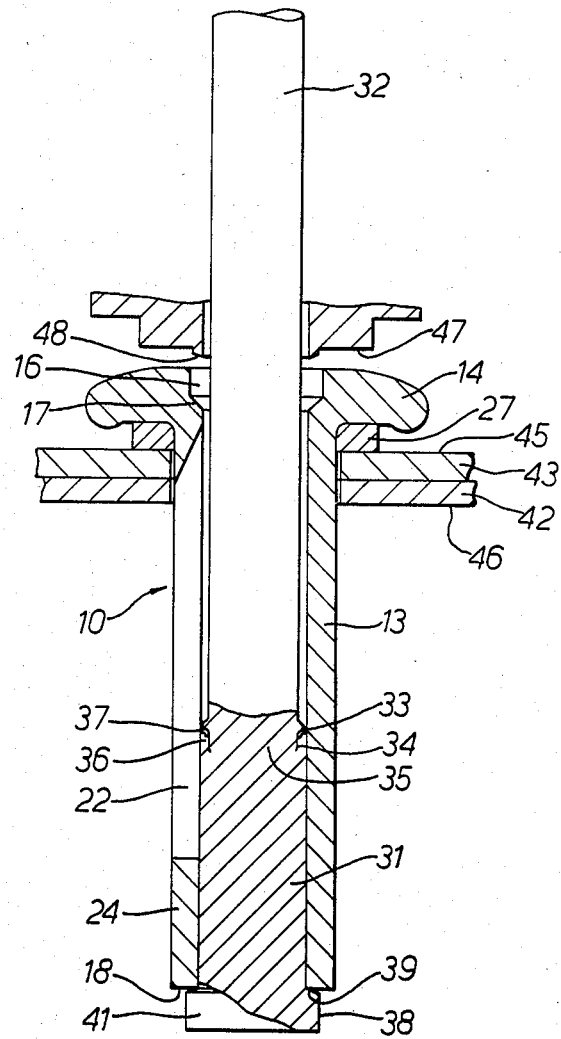
FIG. 4 is a sectional elevation showing the blind rivet assembly positioned and ready to be set in workpieces to be riveted, and showing part of a riveting tool for setting the blind rivet.
Figure 5:
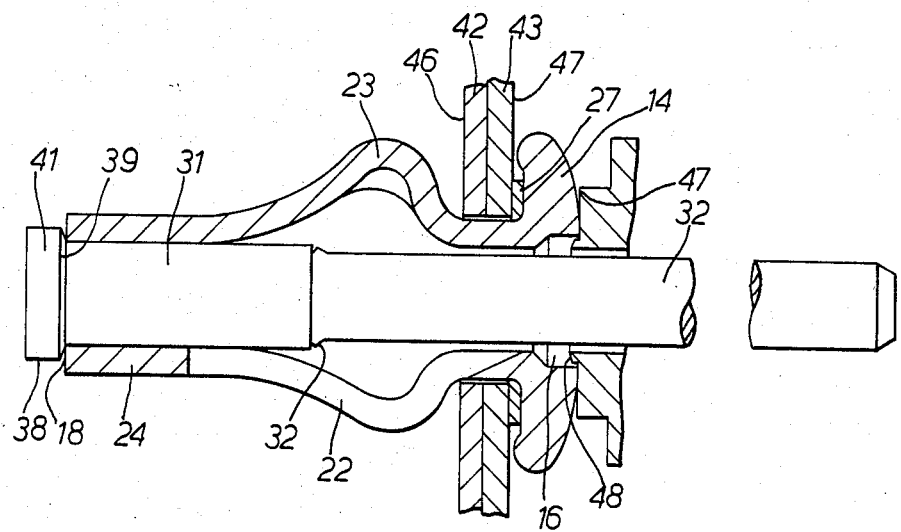
FIGS. 5, 6 and 7 are sectional elevations showing successive stages in the setting of the blind rivet.
Figure 6:
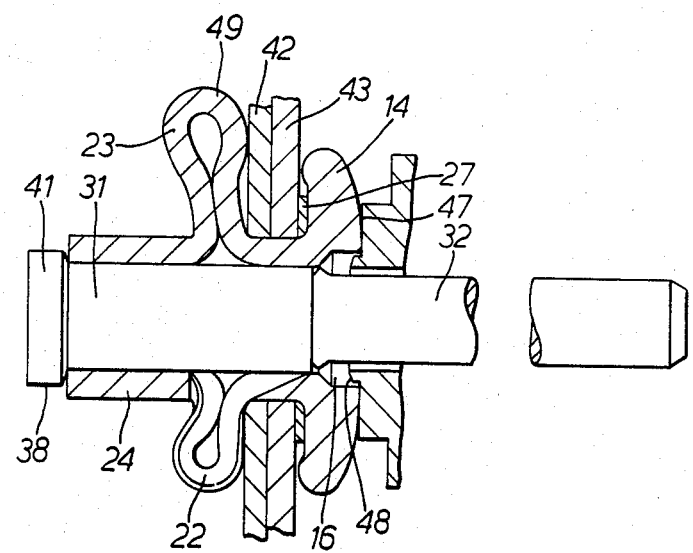

The rivet can be set by means of a rivet setting tool of a known kind sold under the Registered Trade Mark "AVDEL" and comprising means (not shown) for gripping and pulling the pulling portion 32 of the stem which projects from the head of the rivet shell. As illustrated in FIGS. 4, 5 and 6, the tool has annular anvil 47 for abutting the head of the shell and a projecting rim 48 for deforming the locking skirt. The tool is offered up to the rivet so that the pulling portion 32 passes through the anvil 47 into engagement with the gripping and pulling means, and the anvil abuts the shell head 14. The tool is then operated to pull the stem axially relative to the rivet shell, in a direction to draw the plugging portion 31 towards the head 14 of the shell with a progressively increasing force.

Due to the abutment between the face 39 of the stem head 41 and the end face 18 of the shell tail, axial compression is exerted on the shell. Since the weakest portion of the shell is the weakened zone, it is the weakened zone which deforms first. The shell shank tail portion 24 begins to move with the stem towards the shell head 14, accompanied by an outward bending of the three struts 23 at a position generally half-way between the blind face 46 of the panel 42 which constrains the portions of the struts within it against radial expansion and the tail portion 24 of the shell body (see FIG. 5). The plugging portion 31 moves through the outwardly expanded struts and into the part of the shank which extends within the thickness of the workpiece members 42 and 43, slightly expanding the shank radially. This movement of the shell tail portion 31 with the stem continues until the three struts are bent and forced firmly into abutment with the blind face 46, as shown in FIG. 6, so as to constitute a blind head 49 of greater transverse dimension than the apertures of the workpiece.

At this stage, the force required to move the shell tail portion 24 nearer to the head 14 increases abruptly, to the extent that, by applying sufficient force, the stem head 41 causes the tail end part 24 of the shell to deform outwardly, so that the head 41 enters into the tail end part 24 of the shell.

Figure 7:
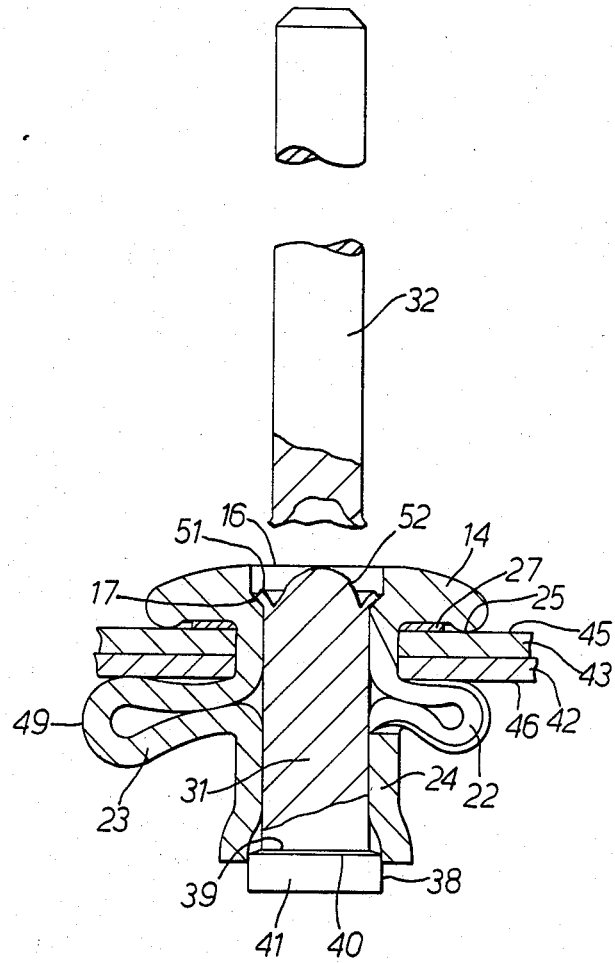

Continued pulling of the mandrel by the tool eventually brings the plugging portion into engagement with the projecting annular rim 48 which projects forwardly of the anvil into the shell head counterbore 16. The rim has an inclined front which, as the plugging portion is drawn towards it, is guided by the bead 33 to engage the skirt annular face 37 and enters the cleavage 34, so as to progressively deforms the locking skirt 36 radially outwardly, away from the central core 35 of the plugging portion. It thereby forms a radially enlarged locking flange 51 (FIG. 7) which abuts at least the inner peripheral edge of the locking shoulder 17, thereby constituting an obstacle to withdrawal of the plugging portion from the body. Once the skirt is fully deformed, the force required to pull the stem further increases abruptly, because of the engagement with the anvil rim 48. On applying sufficient further force, therefore, the breakneck fractures, leaving the plugging portion 31 locked in the body, while the pulling portion 32 becomes detached and can be discarded, as shown in FIG. 7. The fracture face 52 of the plugging portion is about level with, or just inside, the face of the shell head.

The residual tension on the stem clamps the panels 42, 43 together. On the blind face 46 this clamping is transmitted through the blind rivet head 49, which is of substantial radial extent. On the front face 45 the clamping is exerted through the shell head sealing washer 27. It may be that if the residual tension is sufficient, the sealing washer is compressed sufficiently that the rim 25 contracts the face 45 of the panel.

The washer 27 seals the shell head 14 to the front face 45 of the panel, around the aperture 44. The interference fit of the plugging portion 31 in the part of the shell shank within the panels seals the plugging portion to the shell. There is no need for the stem head 41 to seal within the shell tail portion 24 (provided it is mechanically locked therein), because the interior of the shell shank bore is open to the outside space through the slots 22.

Figure 8:
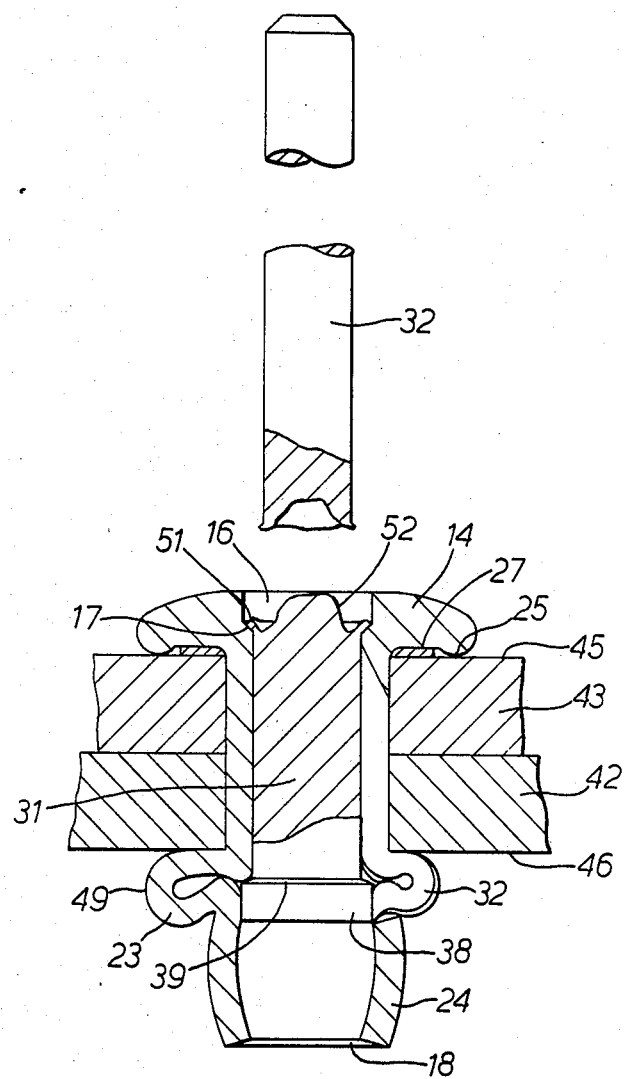
FIG. 8 corresponds to FIG. 7 but shows a similar rivet used to rivet together workpieces of a greater total thickness.

In FIGS. 4, 5, 6 and 7, the example rivet assembly is illustrated being used to fasten together two sheets 42, 43 of a total thickness (or "grip", as the total workpiece thickness is known in the art of blind riveting) which is about the minimum value for which the example rivet assembly can be used. One of the advantages of the rivet illustrated in FIG. 4 is that it has a relatively wide grip range, and FIG. 8 illustrates the use of a similar rivet to fasten together sheets having a grip the maximum value for which this rivet will work successfully. FIG. 8 illustrates the fully installed condition of the rivet assembly, and comparison with FIG. 7 shows that, since a much shorter length of the struts 32 produces from the blind panel face, a radially smaller blind head 49 results. Also the shell shank contracts axially by a much smaller amount due to the shorter folded length of the struts. Since the plugging portion has still been pulled through the shell bore until the locking skirt lies in the shell head conterbore 16, the stem head 41 has necessarily been pulled into the shell bore by a much greater distance than in the minimum grip condition illustrated in FIG. 7.

The maximum grip is determined in practice by the limitations that in the fully installed condition, the stem head 44 cannot enter into the space within the panels, and that the blind head 49 must be large enough to secure the rear panel.

When the stem 41 is pulled into the rivet shell, it is found that, depending on the precise circumstances of each particular placing operation, the sharp leading edge of the head may cut a ring of material from the shell tail portion 24 (most probably from adjacent the tail end face 18 of the shell).

The means by which, in the foregoing embodiment, the formation of a blind head is achieved during setting of the rivet, and by which the plugging portion is enabled to become disengaged from the tail-end portion of the rivet shell may also be modified slightly, as is mentioned below. A number of suitable solutions have been proposed in the past in connection with pull-to-set self-plugging blind rivets. However, it is believed that the solution to this problem described in the foregoing example offers advantages in that, on the one hand it facilitates good control over the different forces required at different stages of the setting operation, and at the same time enables a single size of rivet to be versatile in the range of thickness of workpiece (i.e. "grip range") which can be accommodated. It also makes manufacture of the stem and shell simple, since as described the plugging portion has an uniform external diameter throughout its length (apart from the head), and the shell bore also has a uniform diameter throughout its length (apart from the head end counterbore). Furthermore assembly of the stem and shell is simple, merely requiring the forcing of one into the other.

The invention is not restricted to the details of the foregoing example. For instance the form of the shell may be modified in various ways. In particular, instead of having three struts 22 there could be only two, or a greater number, for example six, made by appropriately varying the number of slits. Furthermore, the material of the shank could be punched out to form slots. Alternatively, the shank could merely be formed with longitudinal shear lines or grooves so as to provide longitudinal weakening of the collapsible part of the shank such as to enable it, on being compressed axially, to split into a plurality of longitudinal struts which can be bent or bowed outwardly until doubled and thereby form a radially enlargeg blind head.

The sealing washer 47 may be omitted from beneath the shell head.

As previously mentioned, the precise form of the stem head 38 may be modified. The conical angle of the underhead face 39 may be greater, up to and including the case where the face is flat. Alternatively it may be somewhat less than the 170 degrees. Similarly, the peripheral face 41 of the stem head may not be cylindrical, but could taper outwardly from its leading edge 40. Such taper would be slight, having an included angle in the range from 0 degrees to about 5 degrees. Variation of the precise shape of underhead face 39 is believed to alter the value of pulling tension at which the stem head initially enters the shell tail, and variation of the precise shape of the stem head peripheral face 41 is believed to alter the tension thereafter required to pull the stem head into the shell tail.

We claim:
1. A blind rivet assembly comprising:
a shell having an elongate shank, a head at one end, and a bore throughout the head and shank;
a shell bore having a radially enlarged counterbore at a head end thereof and an annular locking shoulder facing towards the head end at a junction of the counterbore and a remainder of the bore;
a shell shank having a weakened zone which extends longitudinally of the shank from a position spaced from the tail end of the shank towards the head end thereof;
a stem extending through the bore of the shell and having an elongate pulling portion which projects from the head end of the shell, and an elongate plugging portion connected to the pulling portion by a breakneck and disposed substantially within the shell shank bore, the plugging portion being formed with a radially enlarged stem head at the end thereof remote from the breakneck, and disposed beyond the tail end of the shank, the plugging portion having a diameter greater than a diameter of the pulling portion;
a cylindrical skirt surrounding a portion of said plugging portion adjacent said breakneck and forming an extension of said plugging portion, said skirt having an annular face facing said pulling portion and being separated from said plugging portion by a cleavage having a diameter substantially the same as said pulling portion; and
an annular enlarged diameter bead defined on said pulling portion adjacent said breakneck, said bead having a tapered side and a diameter smaller than that of said skirt and greater than that of said cleavage;
whereby, when the assembly is inserted through aligned apertures in workpieces to be thereby riveted together so that at least part of the shell shank zone projects beyond the workpiece on the blind side thereof, and the pulling portion of the stem is pulled with the increasing tension with respect to the shell by a pulling tool, compression exerted by the stem head on the shell shank tail end causes radial enlargement of at least part of the weakened zone of the shell shank to form a blind head, while the plugging portion moves through the shell bore towards the head end thereof and thereafter the shell shank tail end deforms to allow the entry of the stem head thereinto, and thereafter the skirt is deformable into locking engagement with the annular locking shoulder of the shell counterbore by a projecting rim of the tool, and the stem is fracturable at the breakneck to leave the plugging portion plugging the shell bore, whereby said annular bead guides said projecting rim into alignment with said skirt face.

2. A blind rivet assembly as claimed in claim 1, in which the weakened zone of the shell shank comprises a plurality of circumferentially spaced lines of weakness extending longitudinally of the shank.

3. A blind rivet assembly as claimed in claim 2, in which the lines of weakness comprise slots extending radially through the shank.

4. A blind rivet assembly as claimed in claim 1, in which the plugging portion of the stem is in interference fit in the bore of the shell shank.

5. A blind rivet assembly as claimed in claim 1, in which the bore of the shell shank, apart from the counterbore at the head end, is of substantially, uniform diameter throughout its length.

6. A blind rivet assembly asclaimed in claim 1, in which the plugging portion of the stem, apart from the radially enlarged head, is a substantially uniform diameter throughout its length.

7. A blind rivet assembly as claimed in claim 1, in which the radially enlarged stem head is initially in contact with the adjacent tail end of the shell shank.

8. A blind rivet assembly as claimed in claim 1, in which the stem head has a surface, which faces towards the shell shank, which surface is substantially flat.

9. A blind rivet assembly as claimed in claim 1, in which the stem head has a surface, which faces towards the shell shank, which surface is bounded by a sharp edge.

10. A blind rivet assembly as claimed in claim 9, in which the surface has a diameter which is less than the external diameter of the shell shank at the tail end thereof.

11. A blind rivet assembly as claimed in claim 1, in which the stem head has a peripheral surface which is substantially cylindrical with its minimum diameter at the end thereof which is nearer the shell shank.

12. A blind rivet assembly as claimed in claim 11, in which the uncluded angle of the taper is not more than 10 degrees.

* * * * *

UNITED STATES PATENT AND TRADEMARK OFFICE
CERTIFICATE OF CORRECTION

PATENT NO.    : 4,580,936

DATED         : April 8, 1986

INVENTOR(S)  : Albert C. Francis et al

It is certified that error appears in the above-identified patent and that said Letters Patent is hereby corrected as shown below:

-- The Assignee was spelled incorrectly on the Title page, It should read as follows:

AVDEL LIMITED not

ADVEL LIMITED --

Signed and Sealed this

Fifteenth Day of July 1986

[SEAL]

Attest:

Attesting Officer

DONALD J. QUIGG

Commissioner of Patents and Trademarks